United States Patent
Chaji

(10) Patent No.: US 12,541,108 B2
(45) Date of Patent: Feb. 3, 2026

(54) NONINTRUSIVE HEAD-MOUNTED DEVICE

(71) Applicant: VueReal Inc., Waterloo (CA)

(72) Inventor: Gholamreza Chaji, Kitchener (CA)

(73) Assignee: VueReal Inc., Waterloo (CA)

( * ) Notice: Subject to any disclaimer, the term of this patent is extended or adjusted under 35 U.S.C. 154(b) by 0 days.

(21) Appl. No.: 18/772,448

(22) Filed: Jul. 15, 2024

(65) Prior Publication Data
US 2024/0369845 A1 Nov. 7, 2024

Related U.S. Application Data

(63) Continuation of application No. 17/616,416, filed as application No. PCT/CA2020/050761 on Jun. 3, 2020, now Pat. No. 12,066,630.

(60) Provisional application No. 62/856,501, filed on Jun. 3, 2019.

(51) Int. Cl.
G02B 27/01 (2006.01)
G09F 9/33 (2006.01)

(52) U.S. Cl.
CPC ..... *G02B 27/0172* (2013.01); *G02B 27/0176* (2013.01); *G09F 9/33* (2013.01); *G02B 2027/014* (2013.01); *G02B 2027/0178* (2013.01)

(58) Field of Classification Search
CPC ............ G02B 27/0172; G02B 27/0176; G02B 2027/014; G02B 2027/0178; G09F 9/33; G09F 21/02; G09F 19/18
See application file for complete search history.

(56) References Cited

U.S. PATENT DOCUMENTS

| | | | |
|---|---|---|---|
| 8,705,177 B1 | 4/2014 | Miao | |
| 9,429,772 B1 | 8/2016 | Heinrich et al. | |
| 12,066,630 B2* | 8/2024 | Chaji | G09F 9/33 |
| 2004/0212633 A1* | 10/2004 | Natori | G09G 3/2003 |
| | | | 345/694 |
| 2013/0235331 A1* | 9/2013 | Heinrich | G02C 11/10 |
| | | | 351/158 |
| 2013/0285885 A1* | 10/2013 | Nowatzyk | G09G 5/00 |
| | | | 345/8 |
| 2018/0182275 A1* | 6/2018 | Ahmed | G09G 3/32 |

OTHER PUBLICATIONS

WIPO: PCT International Search Report and Written Opinion relating to PCT application No. PCT/CA2020/050761, dated Aug. 11, 2020.
SIPO: CN Office Action relating to CN application No. 202080040879.6, dated Jun. 10, 2023.
SIPO: CN Office Action relating to CN application No. 202080040879.6, dated Mar. 19, 2024.

* cited by examiner

*Primary Examiner* — Brent D Castiaux

(57) ABSTRACT

Systems, devices and methods for a head-mounted device are provided. In some examples, a head-mounted device comprising a frame having at least one arm, at least one display coupled at a proximity edge of the at least one arm, an electronic system coupled at a proximity another edge of the at least one arm, a data processing unit configured to send and receive data from the display, wherein the data processing unit coupled through the arm between the electronic system and the display; and an optical system configured to project an image from the display to a user's eye, wherein the optical system is mounted at the top of the display.

22 Claims, 5 Drawing Sheets

NONINTRUSIVE HEAD-MOUNTED DEVICE

CROSS-REFERENCE TO RELATED APPLICATIONS

The present application is a continuation of U.S. application Ser. No. 17/616,416 filed Dec. 3, 2021, which is a 371 of PCT/CA2020/050761 filed Jun. 3, 2020, which claims the benefit of 62/856,501 filed Jun. 3, 2019. The contents of each of these prior applications are incorporated herein by reference in their entirety.

BACKGROUND AND FIELD OF THE INVENTION

The present disclosure relates to a wearable head-mounted device employing one or more displays with an optical system placed on top of the display.

Conventionally, head-mounted devices (HMDs) have one or two displays with digital projectors and microscopic mirrors embedded in the device to project images onto an eye of a user. Because of all this circuitry, often the HMDs are heavy and difficult to carry for longer periods of time. Further, these devices offer a limited field of view and a displeasing experience for the user.

Moreover, the display may include cathode ray tubes (CRT), liquid-crystal displays (LCDs), liquid crystals on silicon (LCos), or organic light-emitting diodes (OLED). These conventional displays suffer with low brightness, high power consumption and shorter life span.

Therefore, there is a need for an improved HMD that is simple in structure and can offer a better field of view, high brightness, and low power consumption.

SUMMARY

According to one embodiment, a wearable HMD may be provided. The wearable HMD may be integrated with a microLED display to offer simple structure, better resolution, contrast, luminance, and low power consumption compared with conventional devices.

According to another embodiment, the head mounted device may comprising a frame having at least one arm, at least one display coupled at a proximity edge of the arm, an electronic system coupled at a proximity another edge of the arm, a data processing unit configured to send and receive data from the display, wherein the data processing unit coupled through the arm between the electronic system and the display; and an optical system configured to project an image from the display to a user's eye, wherein the optical system is mounted at the top of the display.

In another embodiment, the optical system may be placed between the display and the user's eye. In one case, the optical system may comprise a concave lens.

In one embodiment, the electronic system may comprise a computing device, a communication unit, a synching unit, and a power unit.

In another embodiment, the display may comprise a micro light emitting diode microdisplay.

In one case, the arm attached to the frame may be made of transparent materials. In another case, the arm may comprise conductive traces for communicating and providing power to the display. The arm may be flexible.

In another embodiment, the HMD may comprise one or more sensors configured to the head mounted device to detect a motion of the eye to start projecting the image from the display.

In one embodiment, the HMD may further comprise one or more sensors to measure the eye focus distance to adjust the optic focal point for the image to be in the focus point of the eye.

In one embodiment, the arm and the display may be integrated to the frame.

According to another embodiment, there may be one two or more displays mounted on the frame or mounted on the arm. The two or more displays cover a wider viewing angle for the user.

According to one embodiment, a head mounted device may be provided. The head mounted device may comprising: a frame having at least one arm, at least one display mounted on the frame in front of a user's eye, an electronic system coupled at a proximity edge of the arm; and an optical system placed between the display and the user's eye to project an image from the display to the user's eye.

According to one embodiment, a method of displaying an image on a head-mounted device may be provided. The method may comprising providing a frame having at least one arm, mounting at least one display on the frame in front of a user's eye, coupling an electronic system at a proximity edge of the arm; and placing an optical system between the display and the user's eye to project an image from the display to the user's eye.

In one case, the two display system may provide images with different content seen at the same time. This feature can be used to show the 3D images, increase the resolution, or add color through showing different colors to each display.

According to another embodiment, the displays may be mounted further away from the edge of the frame. In one case, the power and signal lines may go through a transparent lens or a coil inside the frame may provide power or data to the display.

The foregoing and additional aspects and embodiments of the present disclosure will be apparent to those of ordinary skill in the art in view of the detailed description of various embodiments and/or aspects, which are made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Use of the same reference numbers in different figures indicates similar or identical elements.

Figure 1:
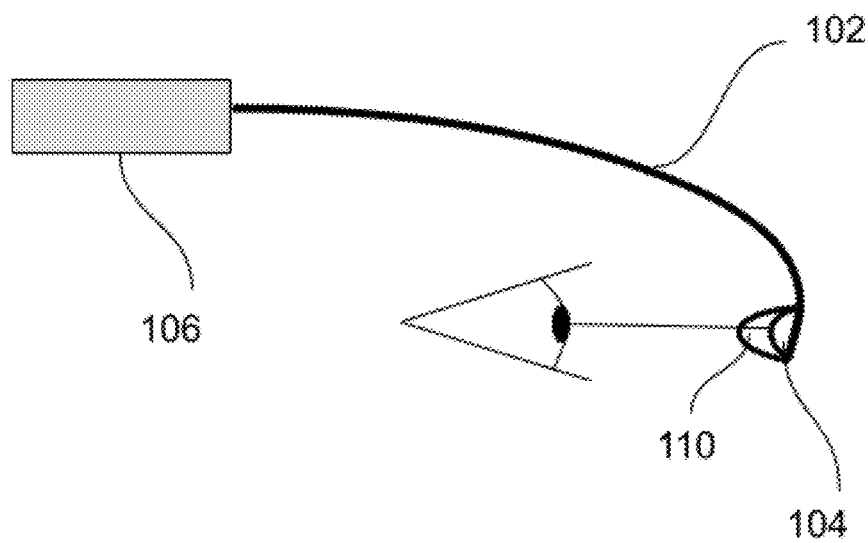
FIG. 1 is a schematic diagram of head-mounted device, in accordance with an embodiment of the invention.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure covers all modifications, equivalents, and alternatives falling within the spirit of the invention as defined by the appended claims.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

This disclosure relates to display devices and more particularly to wearable head-mounted display devices. The head-mounted devices (HMD) may comprise smart eyeglasses, virtual reality headsets, augmented reality headsets and mixed reality headsets. Here, the head-mounted device is implemented as eyeglasses for the purpose of illustration.

Furthermore, this disclosure provides a wearable head mounted display having a micro LED display. The wearable HMD integrated with micro LED display may offer a simpler device, high resolution, contrast, luminance and low power consumption compared with conventional displays.

FIG. 1 is a schematic diagram of heads-mounted device, in accordance with an embodiment of the invention. Here, a display may be mounted on a frame in front of the eye that communicates with an electronic system to project an image into the eye through an optics that is between the eye and the display. The communication may happen through different means. In one case, the arm of the frame carries either power or data signals that are coupled to the display.

The head mounted device may include a frame. The frame may comprise a pair of glasses or a helmet configured to be worn on a user's head. The frame may include at least one arm 102. In one case, there may be two arms on two sides of the frame. In another case, there may be no arm attached to the frame. Here, for example, the frame comprises a structure of an eyeglass.

In one case, the arm 102 may be made of transparent materials and include conductive traces (wire) for communicating and providing power to the display 104. The arm 102 can be pre-formed or can be flexible to be formed by a user.

In one embodiment, an electronic system 106 coupled at a proximity edge of the arm 102. The electronic system may include a processing unit, a communication unit, a synching unit, and a power unit. The processing unit may include a processor to execute instructions. The communication unit may be configured to communicate with the electronic system and the display unit to receive an image. A data processing unit may be coupled through the arm between the electronic system and the display to send and receive data and instructions from the display and other units. The HMD may receive external power through the power unit. The power unit may supply power to the electronic system.

In one embodiment, the HMD further includes at least one display 104 coupled at another proximity edge of the arm. The display may comprise a microdisplay device. The microdisplay may be a micro light emitting diode device. The display unit is configured to emit images or image information to the user. The display receives power or data signals through the electronic system 106 coupled to the arm. In one embodiment the microdisplay may be less than 0.5 cm in size.

In one embodiment, an optical system 110 may be provided on top of the display 106 that projects an image displayed on the display 106 into the user's eye. The optical system may include one or more lenses. The lenses may be concave. The optical system 110 is placed between the display and the user's eye.

In one embodiment, the HMD may further include gesture sensors operable to detect when the user is looking at the display to start projecting images. In another embodiment, there may be sensors to measure the eye focus distance to adjust the optic focal point for the image to be in the focus point of the eye.

Figure 2:
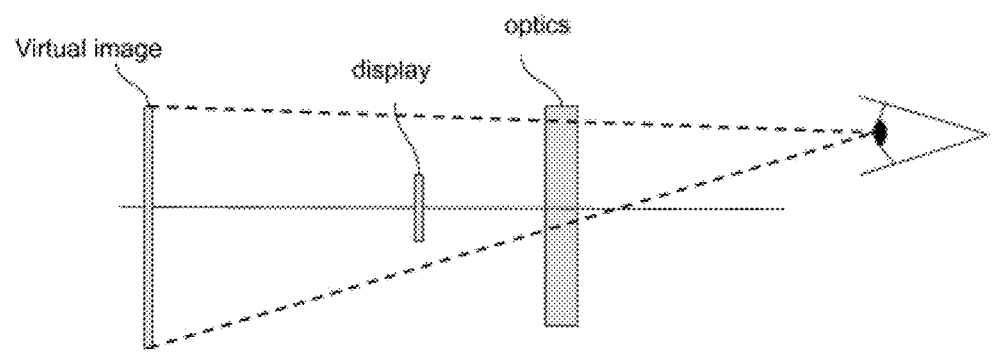
FIG. 2 shows an example of an optical system creating a virtual image of the display, in accordance with an embodiment of the invention.

FIG. 2 shows an example of an optical system with the display. Here, the optical system 202 is placed between the display 204 and the user's eye. The optical system 202 forms a virtual image 206 in further away from the user's face after it is projected into the user's eyes 210. The virtual image 206 is magnified also to enable ease of access to the information and data from the display 204.

Figure 3A:
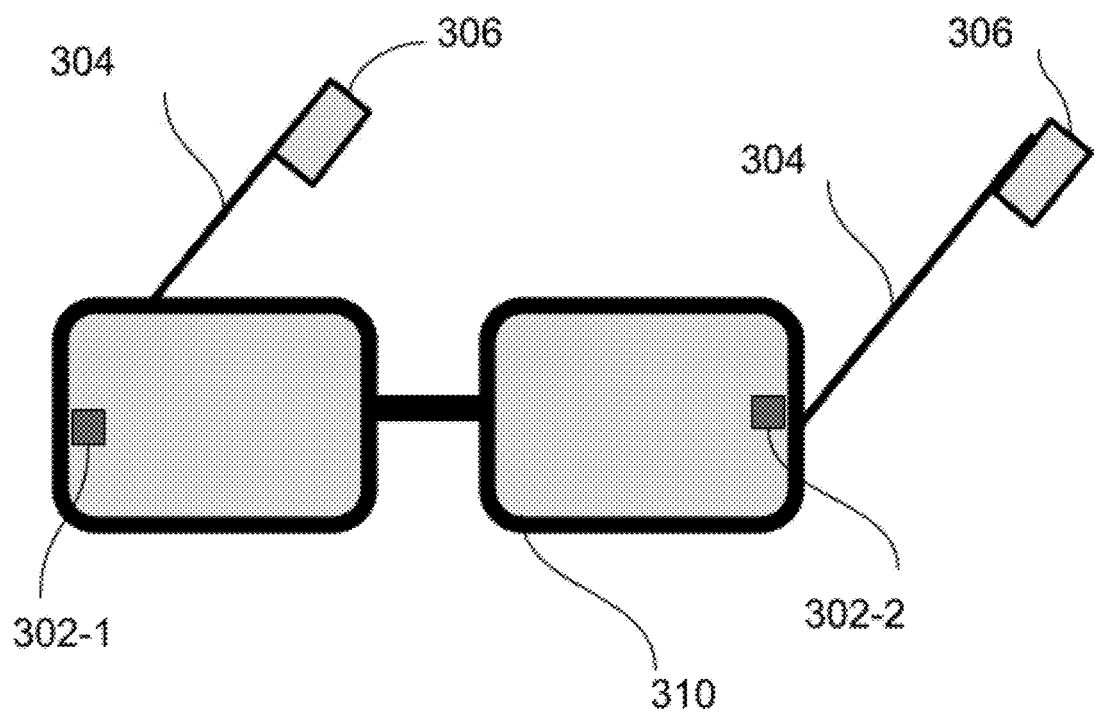
FIG. 3A shows an example of a head mounted device with two displays, in accordance with an embodiment of the invention.

FIG. 3A shows an example of a head-mounted device with two displays, in accordance with an embodiment of the invention. Here, one or more displays (302-1, 302-2) may be mounted on the frame 310. Here, for example, the frame 310 comprises a structure of an eyeglass. The optical system may be provided on top of the displays (302-1, 302-2) that projects an image from the display 106 into the user's eye. The optical system is placed between the display and the user's eye. The displays (302-1, 302-2) can be mounted on the glass frame 310 or separately at a proximity edge of the frame arm 304. The combination of the two displays (302-1, 302-2) can cover wider viewing. For example, from one side to the center can be covered by the first display (e.g., 302-1) and from the center to the other side can be covered by the second display (302-2).

In another embodiment, an electronic system 306 coupled at a proximity another edge of the arm 304. The electronic system may include a processing unit, a communication unit, a synching unit, and a power unit. The processing unit may include a processor to execute instructions. The communication unit may be configured to communicate with the electronic system and the display unit. A data processing unit may be coupled through the arm between the electronic system and the display unit to send and receive data and instructions from the display unit and other units.

Figure 3B:
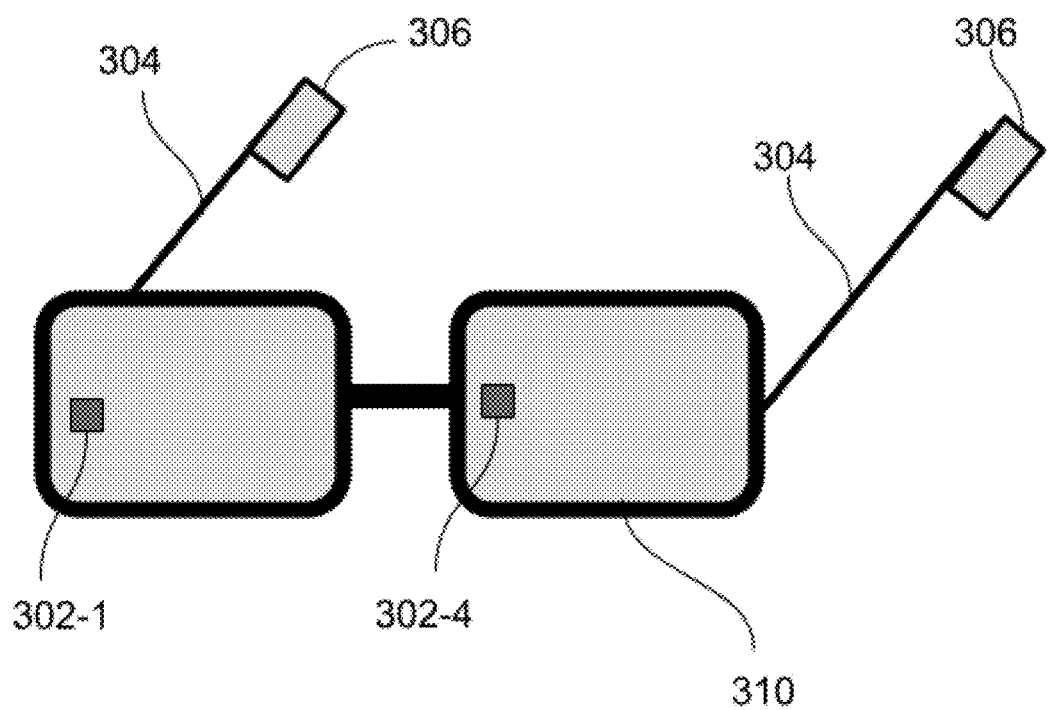
FIG. 3B shows another example of a head mounted device with two displays, in accordance with an embodiment of the invention.

FIG. 3B shows an example of a head mounted device with two displays, in accordance with an embodiment of the invention. Here, one or more displays (302-1, 302-2) may be mounted on the frame 310, where the images will be seen at the same time. In one case, a display (e.g., 302-1) may be mounted at a proximity edge of the glass frame 310 or separately at a proximity edge of the frame arm 304. Other displays (e.g., 302-4) may be mounted further away from the edge of the frame. Here, when a user's eyes tilt toward the displays, the content of both displays is projected into the eyes (each display projects in different eyes). This feature can be used to show the 3D images, increase the resolution, or add color through showing different colors to each display.

Figure 3C:
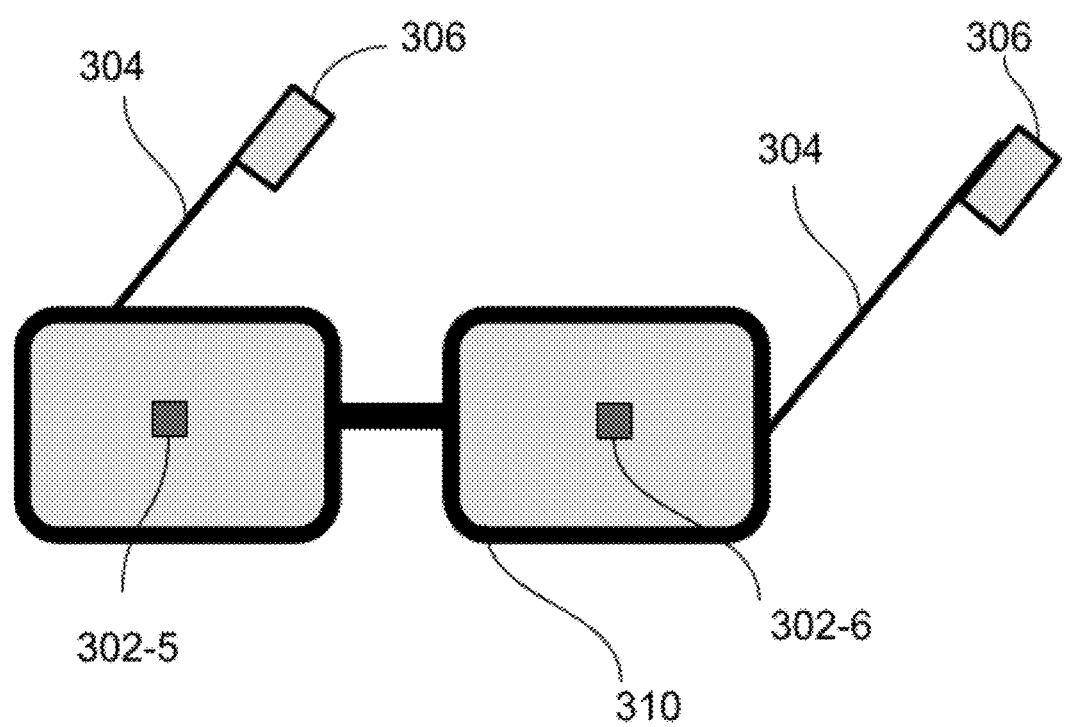
FIG. 3C shows another example of a head mounted device with two displays, in accordance with an embodiment of the invention.

FIG. 3C shows an example of a head mounted device with two displays, in accordance with an embodiment of the invention. The two displays (302-5, 302-6) may be mounted on the frame 310, where the images will be seen at the same time. Here, the displays (302-5, 302-6) are further away from the edge of the frame 310

In one embodiment, transparent data and power lines may go through a lens carrying signals and power to the display that is placed further away from the edge of the frame.

In another embodiment, coils inside the frame may be coupled with the display to carry signal and power to the display that is placed further away from the edge of the frame.

Figure 4:
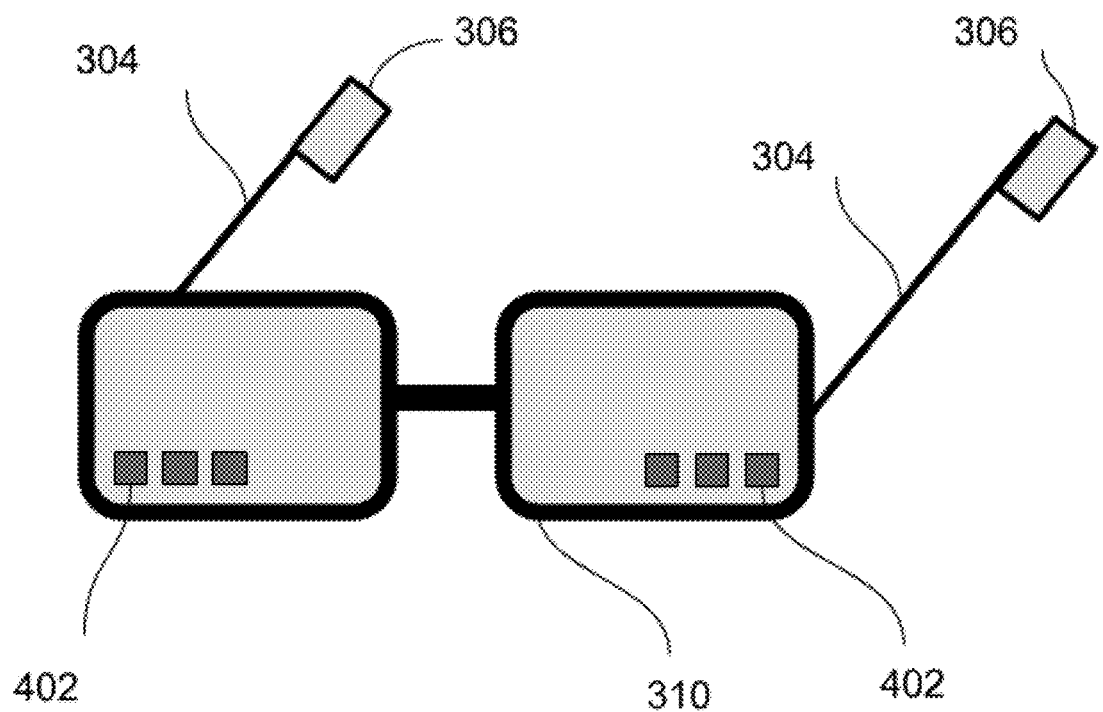
FIG. 4 shows an example of a head mounted device with multiple displays, in accordance with an embodiment of the invention.

FIG. 4 shows an example of a head mounted device with multiple displays, in accordance with an embodiment of the invention. Here, multiple displays 402 may be mounted on the frame for each eye. As the eye moves around different displays, the optical system integrated at the top of the display may project all or part of the image to the eye. According to one embodiment, image stitching techniques can be used to create a uniform image. Also, when a user demands some information, depending on the position of the eye, one of the displays can start projecting image into the eye.

In an alternative embodiment, the arm and the display can be also part integrated into the display device. e.g., eyeglasses.

According to another embodiment, the head mounted device may comprising a frame having at least one arm, at least one display coupled at a proximity edge of the arm, an electronic system coupled at a proximity another edge of the arm, a data processing unit configured to send and receive data from the display, wherein the data processing unit coupled through the arm between the electronic system and the display; and an optical system configured to project an image from the display to a user's eye, wherein the optical system is mounted at the top of the display.

According to yet another embodiment, the optical system may be placed between the display and the user's eye, the electronic system may comprise a computing device, a communication unit, a synching unit, and a power unit and the display comprises a micro light emitting diode microdisplay. The optical system may comprise a concave lens.

According to some embodiments, the arm may be made of transparent materials. The arm comprises conductive traces for communicating and providing power to the display. The arm may be flexible.

According to another embodiment, the head-mounted device may further comprising one or more sensors configured to detect a motion of the eye to start projecting the image from the display and one or more sensors configured to measure the eye focus distance to adjust the optic focal point for the image to be in the focus point of the eye.

According to one embodiment, a head mounted device may be provided. The head mounted device may comprising: a frame having at least one arm, at least one display mounted on the frame in front of a user's eye, an electronic system coupled at a proximity edge of the arm; and an optical system placed between the display and the user's eye to project an image from the display to the user's eye.

According to further embodiments, the optical system may comprise a lens and the arm of the frame carries either power or data signals that are coupled to the display. At least another display may be mounted at the further edge of the frame.

According to one embodiment, the head-mounted device may comprise one or more sensors configured to detect a motion of the eye to start projecting the image from the display.

According to one embodiment, a method of displaying an image on a head-mounted device may be provided. The method may comprising providing a frame having at least one arm, mounting at least one display on the frame in front of a user's eye, coupling an electronic system at a proximity edge of the arm; and placing an optical system between the display and the user's eye to placing an optical system between the display and the user's eye to project an image from the display to the user's eye.

While the present disclosure is susceptible to various modifications and alternative forms, specific embodiments or implementations have been shown by way of example in the drawings and are described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

The invention claimed is:

1. A head-mounted optical display system comprising:
a frame having at least one arm;
multiple displays coupled at a proximity edge of the at least one arm for one of the user's eyes, wherein each of the multiple displays comprises a micro light emitting diode microdisplay that is less than 0.5 cm in size;
an electronic system coupled at a proximity another edge of the at least one arm;
a data processing unit configured to send and receive data from the multiple displays, wherein the data processing unit coupled through the arm between the electronic system and the multiple displays; and
an optical system configured to project a part of an image from the multiple displays to the one of the user's eyes, wherein the optical system is mounted at the top of the multiple displays, and wherein after a user demand for information, depending on a position of an eye, one of the displays starts projecting the part of the image into the eye.

2. The head-mounted optical display system of claim 1, wherein the optical system is placed between the multiple displays and the one of the user's eyes.

3. The head-mounted optical display system of claim 1, wherein the electronic system comprises a computing device, a communication unit, a synching unit, and a power unit.

4. The head-mounted optical display system of claim 1, wherein the optical system comprises a concave lens.

5. The head-mounted optical display system of claim 1, wherein the arm is made of transparent materials.

6. The head-mounted optical display system of claim 1, wherein the arm comprises conductive traces for communicating and providing power to the multiple displays.

7. The head-mounted optical display system of claim 1, wherein the arm is flexible.

8. The head-mounted optical display system of claim 1, further comprising:
one or more sensors configured to detect a motion of the one of the user's eyes to start projecting the image from the multiple displays.

9. The head-mounted optical display system of claim 1, further comprising:
one or more sensors configured to measure the eye focus distance to adjust the optic focal point for the part of the image to be in the focus point of the one of the user's eyes.

10. The head-mounted optical display system of claim 1, wherein the arm and the multiple displays are integrated to the frame.

11. The head-mounted optical display system of claim 1, wherein the multiple displays form a set of multiple displays, and the head-mounted optical display system further comprises another set of multiple displays mounted on the frame for another one of the user's eyes, wherein the optical system is configured to project a part of an image from the other set of multiple displays to the other one of the user's eyes.

12. A head-mounted optical display system comprising:
   a frame having at least one arm;
   multiple displays mounted on the frame in front of one of the user's eyes, each of the multiple displays comprising a micro light emitting diode microdisplay that is less than 0.5 cm in size;
   an electronic system coupled at a proximity edge of the arm; and
   an optical system placed between the multiple displays and the one of the user's eyes to project a part of an image from the multiple displays to the one of the user's eyes, and wherein after a user demand for information, depending on a position of an eye, one of the displays starts projecting the part of the image into the eye.

13. The head-mounted optical display system of claim 12, wherein the optical system comprises a lens.

14. The head-mounted optical display system of claim 12, wherein the arm of the frame carries either power or data signals that are coupled to the multiple displays.

15. The head-mounted optical display system of claim 12, wherein the multiple displays are mounted further away from an edge of the frame.

16. The head-mounted optical display system of claim 15, wherein transparent data and power lines go through a lens carrying signals and power to the multiple displays that are mounted further away from the edge of the frame.

17. The head-mounted optical display system of claim 15, wherein coils inside the frame provide signal and power to the multiple displays that are mounted further away from the edge of the frame.

18. The head-mounted optical display system of claim 12, further comprising:
   one or more sensors configured to detect a motion of the one of the user's eyes to start projecting the image from the multiple displays.

19. A method of displaying an image on an optical display system comprising:
   providing a frame having at least one arm;
   mounting multiple displays on the frame in front of one of the user's eyes, each of the multiple displays comprising a micro light emitting diode microdisplay that is less than 0.5 cm in size;
   coupling an electronic system at a proximity edge of the arm; and
   placing an optical system between the multiple displays and the one of the user's eyes to project a part of an image from the multiple displays to the one of the user's eyes, and wherein after a user demand for information, depending on a position of an eye, one of the displays starts projecting the part of the image into the eye.

20. The method of claim 19, wherein the arm comprises conductive traces for communicating and providing power to the multiple displays.

21. The method of claim 19, wherein image stitching techniques are used to create a uniform image.

22. The method of claim 19, wherein after a user demand for information, depending on a position of an eye, one of the displays starts projecting the part of the image into the eye.

* * * * *